United States Patent
Hamada et al.

(10) Patent No.: US 6,982,131 B1
(45) Date of Patent: Jan. 3, 2006

(54) STRUCTURE FOR ELECTRODE TERMINALS OF BATTERY MODULE

(75) Inventors: Shinji Hamada, Toyohashi (JP); Izumi Yamamura, Toyohashi (JP); Noriyuki Fujioka, Kosai (JP); Shuhei Marukawa, Toyohashi (JP); Toyohiko Eto, Toyota (JP); Keiji Shukuya, Nagoya (JP); Yoshiaki Ogata, Toyohashi (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 277 days.

(21) Appl. No.: 09/684,421

(22) Filed: Oct. 6, 2000

Related U.S. Application Data (63) Continuation-in-part of application No. 29/119,908, filed on Mar. 10, 2000, now Pat. No. Des. 437,287.

(30) Foreign Application Priority Data

Oct. 8, 1999 (JP) .................................. 11-288796
Apr. 6, 2000 (JP) ............................. 2000-104256

(51) Int. Cl.
*H01M 2/02* (2006.01)
*H01M 2/06* (2006.01)

(52) U.S. Cl. ...................... 429/148; 429/151; 429/163; 429/176; 429/179; 429/182

(58) Field of Classification Search ................ 429/148, 429/151, 159, 163, 176, 179, 182
See application file for complete search history.

(56) References Cited

U.S. PATENT DOCUMENTS

| | | | |
|---|---|---|---|
| 3,767,467 A * | 10/1973 | Miller et al. ................. | 429/179 |
| 3,844,841 A | 10/1974 | Baker | |
| 4,207,390 A * | 6/1980 | Oehrlein et al. ............. | 429/179 |
| 4,592,972 A * | 6/1986 | Juergens et al. ............ | 429/160 |
| D437,287 S * | 2/2001 | Hamada et al. ............ | D13/103 |
| 6,230,834 B1 * | 5/2001 | Van Hout et al. .......... | 180/68.5 |
| 6,455,190 B1 * | 9/2002 | Inoue et al. ................ | 429/160 |

FOREIGN PATENT DOCUMENTS

| | | |
|---|---|---|
| EP | 0050489 | 4/1982 |
| EP | 0669663 | 8/1995 |
| EP | 0771037 | 5/1997 |
| EP | 0817287 | 1/1998 |
| EP | 0962993 | 12/1999 |
| EP | 1091427 | 4/2001 |
| GB | 1218329 | 1/1971 |

(Continued)

*Primary Examiner*—Susy Tsang-Foster
(74) *Attorney, Agent, or Firm*—Jordan and Hamburg LLP (57) ABSTRACT

On the opposite end walls of a flat, prismatic battery case of a battery module where electrode terminals are attached, protruding components are formed such as to protrude further than the electrode terminals. Terminal holes are formed in the end walls in which the electrode terminals are fitted, and the thickness of the end walls of the integral battery case in the vicinity of the terminal holes is not the same on both sides of each of the terminal holes. Also, one or a plurality of vertical and horizontal ribs are formed on the end walls between the electrode terminals and the protruding components. Further, a sealing structure is included for a battery.

13 Claims, 8 Drawing Sheets

FOREIGN PATENT DOCUMENTS

| | | |
|---|---|---|
| GB | 2162363 | 1/1986 |
| JP | 7-161377 | 6/1995 |
| JP | 08031398 | 2/1996 |
| WO | WO9831059 | 7/1998 |
| WO | WO9921236 | 4/1999 |

* cited by examiner

Prior Art

STRUCTURE FOR ELECTRODE TERMINALS OF BATTERY MODULE

The present application is a continuation-in-part of prior application Ser. No. 29/119,908, filed Mar. 10, 2000, now U.S. Pat. No. D437,287 S, issued Feb. 6, 2001.

BACKGROUND OF THE INVENTION

The present invention relates to a prismatic rechargeable battery module in which electrode plates and electrolyte are contained and sealed in a prismatic battery case, and electrode terminals are provided protruding from both ends of this prismatic battery case in the longitudinal direction. More particularly, the present invention relates to an improved structure for the electrode terminals of such rechargeable battery module.

Because of their excellent energy density, nickel metal hydride batteries and other such alkaline rechargeable batteries have in recent years come to be utilized as the power source for electric automobiles, for example. In an effort to obtain a large output while preserving a compact size, a sealed prismatic rechargeable battery has been proposed in Japanese Laid-Open Patent Application H7-161377, for instance, in which a prismatic battery case holds an electrode plate group in which positive electrode plates and negative electrode plates are stacked parallel to the long-side plane of the case with separators imposed therebetween, and the case is sealed.

Figure 7:
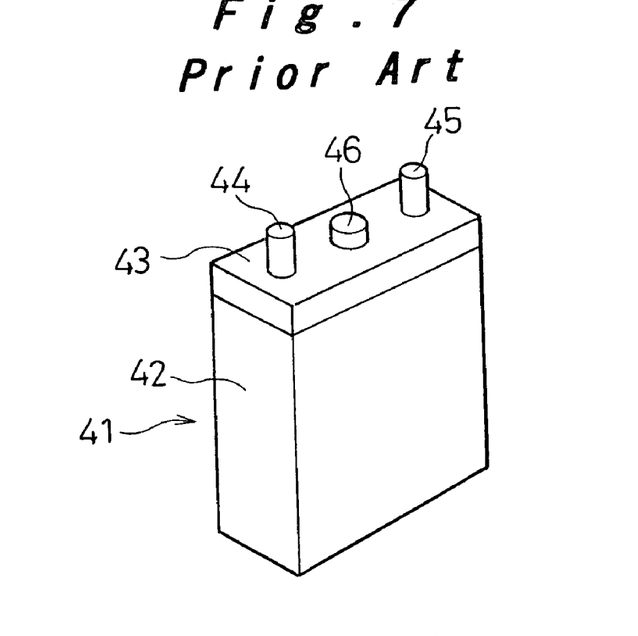
FIG. 7 is an oblique view of a conventional sealed prismatic battery.

As shown in FIG. 7, with this type of sealed prismatic rechargeable battery, positive and negative electrode terminals 44 and 45 connected via leads to numerous positive electrode plates and negative electrode plates of an electrode plate group are provided protruding from the top of a lid 43 that seals the top opening of a battery case 42. Numeral 46 is a safety vent that releases internal gas when the pressure rises above a certain point within the battery case 42.

When used as a battery power source, these sealed prismatic batteries (battery modules) 41 are lined up in one or a plurality of rows with their long-side surfaces facing each other and are electrically connected in series by successively connecting the terminals 44 and 45 of the positive and negative electrodes of adjacent battery modules 41, the result of which is that a specific output voltage is obtained. However, a problem with thus electrically connecting numerous battery modules 41 over the lids 43 thereof is that the complicated connecting structure drives up the cost.

Figure 8:
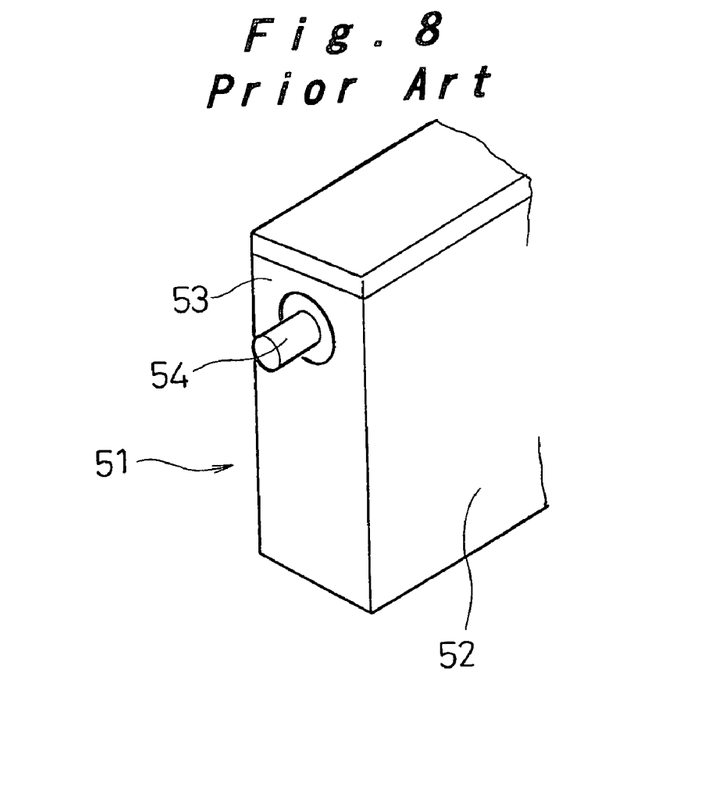
FIG. 8 is a partial oblique view of a modified version of a conventional sealed prismatic battery.

In view of this, as shown in FIG. 8, there is proposed a structure in which a plurality of cells are housed in a flat, prismatic battery case 52 in the longitudinal direction thereof and are serially connected inside the battery case 52 to configure a battery module 51, and electrode terminals 54 are provided protruding from the end walls 53 in the longitudinal direction thereof.

With a battery module 51 structured such as his, far fewer connections of the electrode terminals 54 outside of the battery module 51 are required to obtain given output voltage, the cost is lower, and a compact battery power source can be obtained.

Still, with the structure of the battery module 51 shown in FIG. 8, in the event of a collision of the electric vehicle in which this battery module is installed, for instance, there is the danger that the struck object will hit the battery module 51 from the side and that the impact will be borne directly by the electrode terminals 54. The problem if this should happen is that the electrode terminals 54 may move so far that a short-circuit occurs.

Figure 9A:
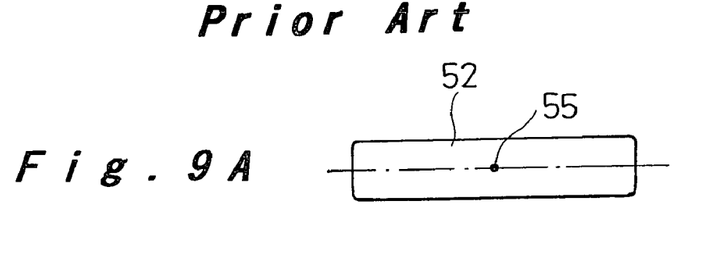
FIG. 9 is a diagram illustrating the layout positions of the gates during the injection molding of the case of a sealed prismatic battery.
Figure 9B:
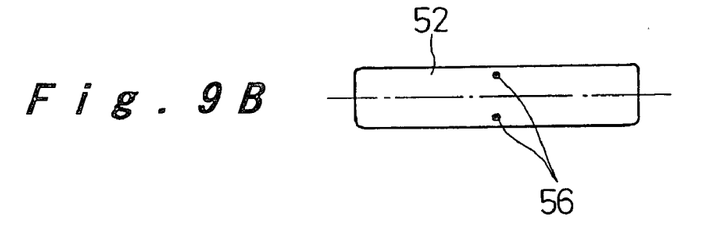
Figure 10:
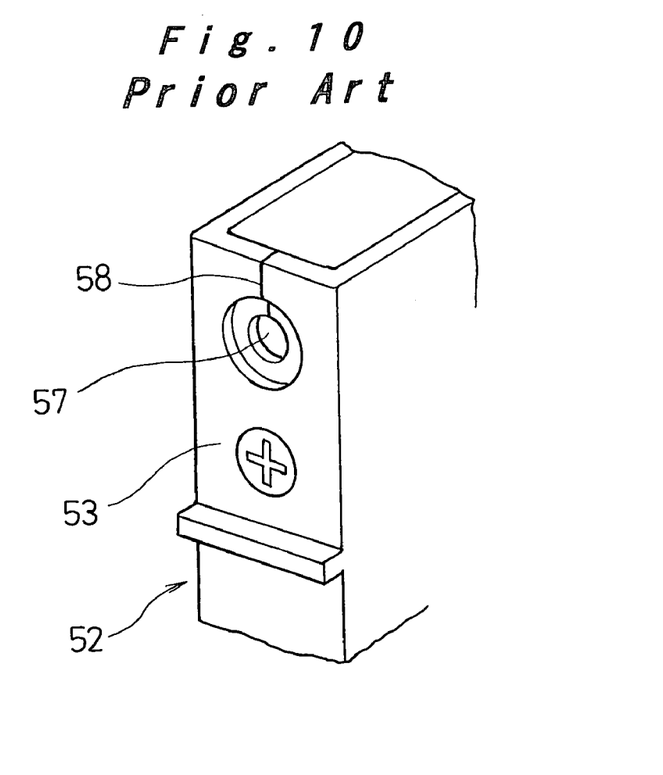
FIG. 10 is a detail oblique view of the main components of a battery case in a modified version of a conventional sealed prismatic battery.

Another problem is that, the battery case 52 of this battery module 51 is manufactured by injection molding with a one-point gate 55 located in the middle of the bottom surface as shown in FIG. 9A, or with a two-point gate 56 provided symmetrically on either side of the center line in the longitudinal direction as shown in FIG. 9B. In this case, as shown in FIG. 10, the resin splits up and flows to the right and left sides at the each of the terminal holes 57 provided for the mounting of the electrode terminals 54 in the end walls of the battery case 52, after which these flows come into contact along the center line above each terminal hole 57, and consequently a weld line 58 is created along the center line above the terminal holes 57.

In addition to the fact that the flows of resin do not merge completely at this weld line 58, resulting in a portion of lower strength, the portions located long the center lines above the terminal holes 57 have the smallest cross sectional area, and stress builds up these portions. Therefore, if the internal pressure of the battery case 52 should rise, or if the electrode terminals 54 should be subjected to an external force or vibration, cracks will tend to develop at the weld lines 58, which is a problem in that adequate attachment strength cannot be ensured for the electrode terminals 54.

A further problem is that, these battery modules 51 are lined up so that their long-side surfaces face each other and bound together with end plates disposed at the two ends thereof to constitute a battery pack, and in such state, the long-side surfaces of the battery modules 51 are tightly held together, but the end walls are not, so if the internal battery pressure rises there is the danger that the end walls will become distended and have an adverse effect on the connections of the electrode terminals 54.

Furthermore, with is type of battery module 51, when external wiring or a bus bar connecting the battery modules 51 is connected to the electrode terminals 54, these are clamped with a nut, but this results in a large rotational torque acting on the electrode terminals 54 at the time of connection, and a suitable means for stopping the rotation of the electrode terminals 54 is required.

A conventional anti-rotation means generally involves extending the anti-rotation component as far as possible past the electrode terminals 54 and engaging the distal end thereof with part of the battery case 52, but a problem is that because the rotational torque is received by point engagement between the battery case and the distal end of the anti-rotation component, excessive stress acts on the engagement component and tends to break the distal end of the anti-rotation component, but if an attempt is made to reduce the action load, then the anti-rotation component ends up being larger.

The present invention was conceived in light of the above problems encountered in the past, and it is an object thereof to provide a prismatic rechargeable battery module with which the electrode terminals do not readily bear the impact if the battery module is hit by an object from the side, with which a suitable state of electrical connection can be maintained even if an external force acts on the electrode teals or the internal battery pressure rises, with which the rotation of the electrode terminals can be stopped with a compact structure, and which affords high reliability with respect to loads against the electrode terminals.

SUMMARY OF THE INVENTION

A sealed, prismatic, rechargeable battery module according to one aspect of the present invention comprises: a prismatic battery case; terminal holes respectively formed in each of longitudinal opposite end walls of said prismatic battery case; electrode terminals respectively mounted in each of said terminal holes; and protruding components formed protruding from each of said longitudinal opposite end walls of the prismatic battery case.

Other and further objects, features and advantages of the invention will be apparent more fully from the following description.

BRIEF DESCRIPTION OF THE DRAWINGS

FIG. 1 illustrates an embodiment of the sealed prismatic battery of the present invention, with FIG. 1A being a plan view, and FIG. 1B a front view;

FIG. 4 illustrates the electrode terminal mounting portion of the battery case in this same embodiment, with FIG. 4A being a side view, FIG. 4B a vertical cross section, and FIG. 4C an enlarged cross section along the IVC—IVC line in FIG. 4A;

FIG. 5 illustrates the electrode teals in this same embodiment, with FIG. 5A being a partially cut away front view, FIG. 5B a right side view of FIG. 5A, FIG. 5C an enlarged cross section along the VC—VC line in FIG. 5B, and FIG. 5D an enlarged cross section along the VD—VD line in FIG. 5B;

FIG. 6 illustrates another embodiment of the sealed prismatic battery of the present invention, with FIG. 6A being a plan view of the main components, and FIG. 6B a vertically cut-away front view of the same;

DESCRIPTION OF THE PREFERRED EMBODIMENTS

An embodiment of the prismatic battery module of the present invention will now be described through reference to FIGS. 1 to 5.

Figure 1A:
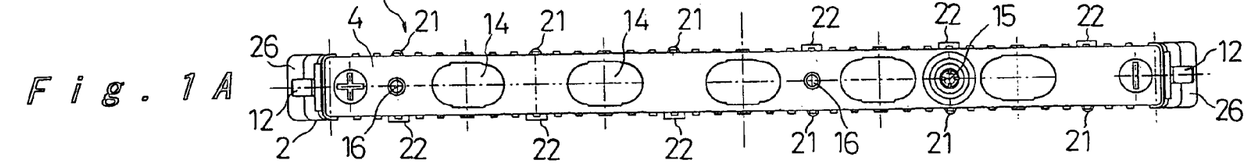

The sealed prismatic battery module 1 in this embodiment consists of a nickel metal hydride battery that can be used to advantage as a drive power source for an electric vehicle. As shown in FIG. 1, a plurality of (six in the illustrated example) prismatic cell cases 3 that are open at the top and have narrow short-side surfaces and broad long-side surfaces are integrally linked together shag their short-side surfaces to configure a flat prismatic integral battery case 2. The openings at the tops of the cell cases 3 are integrally closed off by an integral lid 4.

Each cell case 3 contains an electrode plate group 5, comprising numerous positive and negative electrode plates that are parallel to the long-side surfaces of the cell case 3 and that are stacked in the short-side direction with separators between them, and collector plates 6 that are joined to both ends of this electrode plate group 5. The result is a cell 7.

Each electrode plate group 5 comprises numerous positive electrode plates and numerous negative electrode plates disposed in alternating fashion, and each positive electrode plate is covered with a sheath-like separator having openings in the lateral direction. The lateral edges of the group of positive electrode plates protrude beyond the group of negative electrode plates on one side, and the lateral edges of the group of negative electrode plates protrude beyond the group of positive electrode plates on the opposite side, and these protruding lateral portions form the lead portions, to the lateral ends of which collector plates 6 are welded, respectively.

Terminal holes 10 are formed at the upper ends of the end walls at both ends of the integral battery case 2, and connecting holes 11 are formed in the upper ends of partitions 9 between the cell cases 3. As will be described in detail below, electrode terminals 12 (one for the positive electrode and one for the negative electrode) are mounted in the terminal holes 10 of the end walls 8 at both ends, and the cells 7 on both sides of each partition 9 are serially connected through the connecting holes 11.

Figure 2:
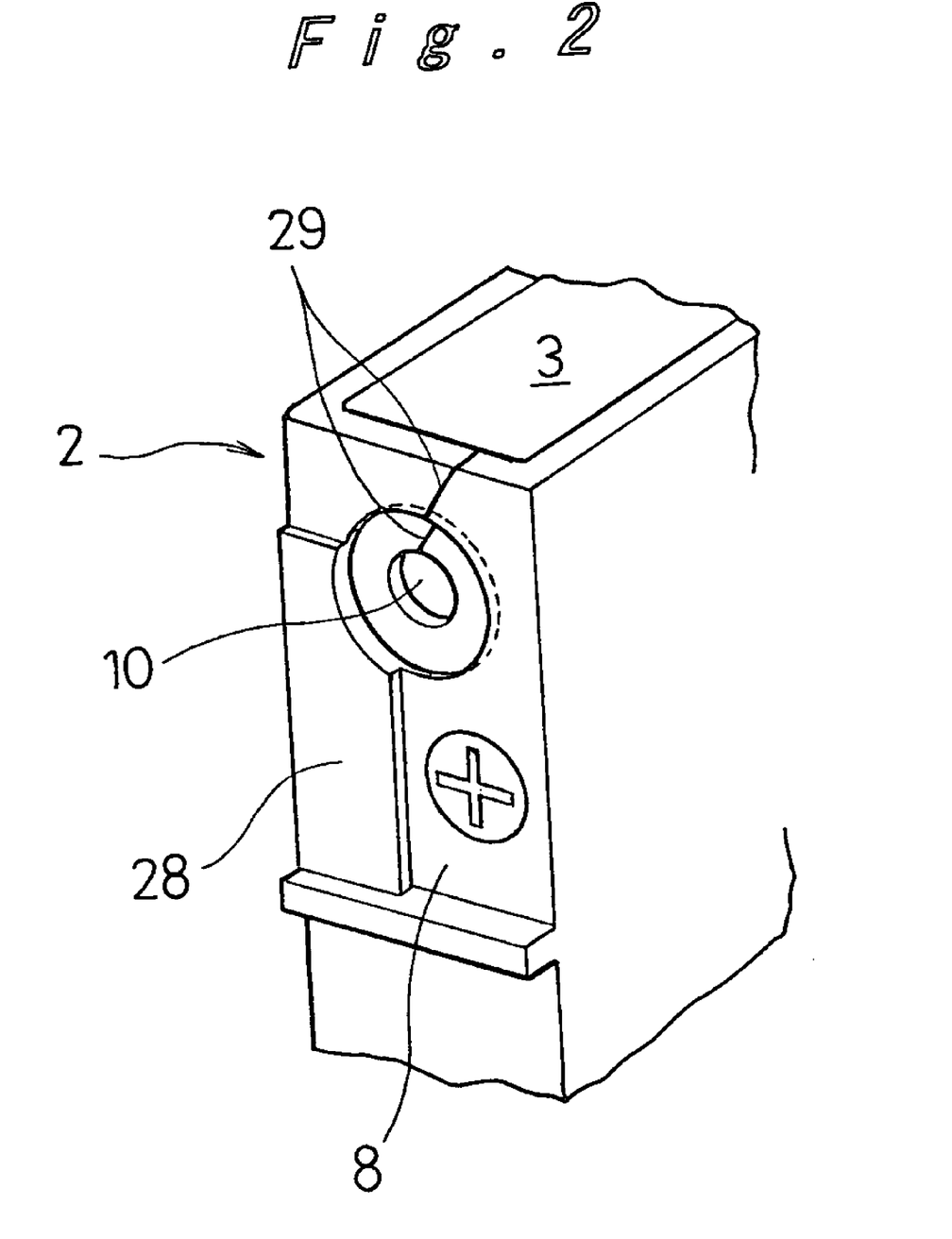
FIG. 2 is a detail oblique view of the main components of the battery case in this same embodiment.

As shown in FIG. 2, at the upper end of each of the end walls 8 at both ends of the integral battery case 2, a thick-walled portion 28 is formed over a suitable range in the vertical direction to one side of the portion close to the terminal hole 10, so that the wall thickens is not the same on both sides of the terminal hole.

Figure 3:
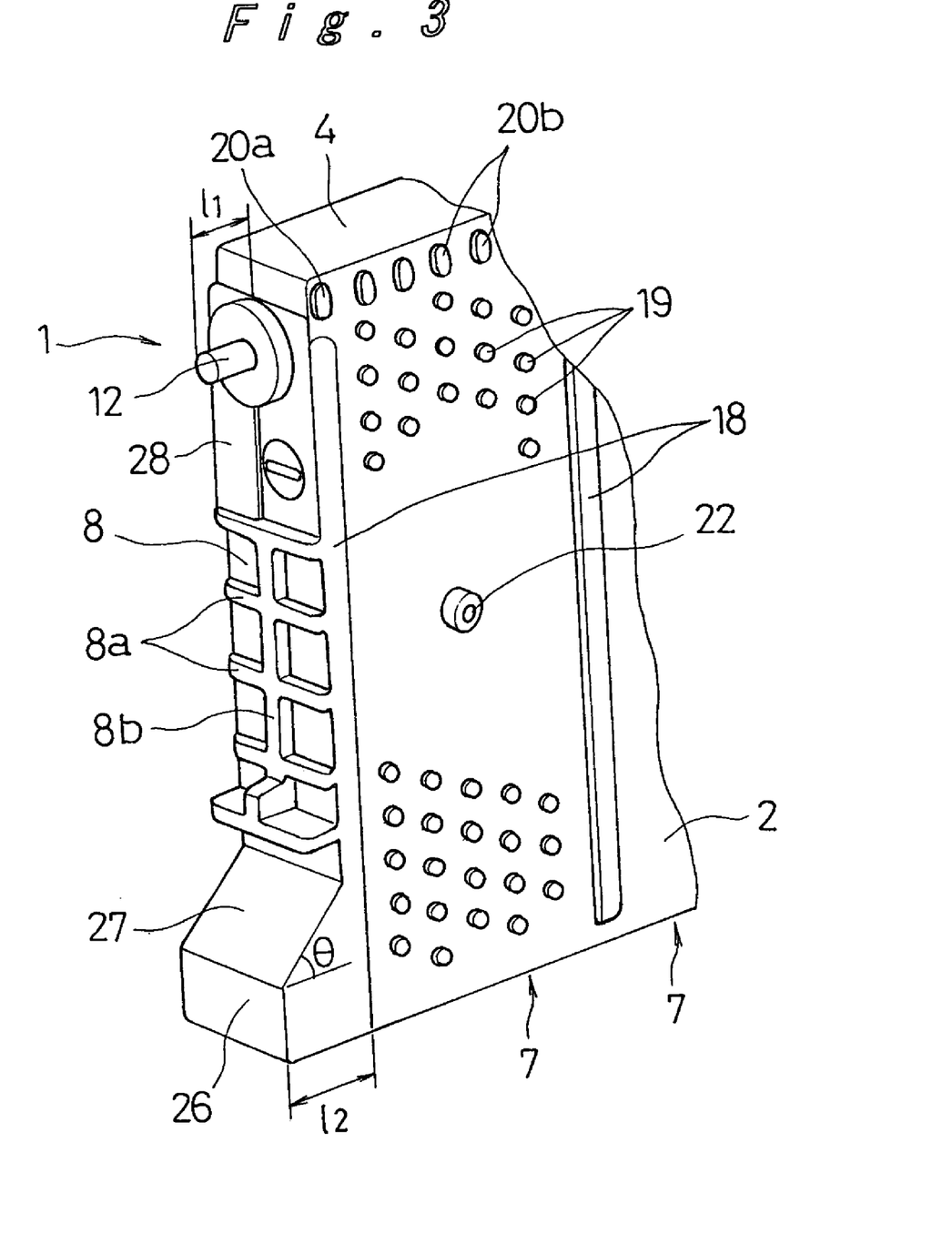
FIG. 3 is an oblique view of the end of the sealed prismatic battery in this same embodiment.

Also, as shown in FIG. 3, a plurality of horizontal ribs 8a and one or more vertical ribs 8b are provided protruding in a lattice pattern from the outer surface of the middle part of the end wall 8, excluding the upper end portion and the protruding component 26 provided at the lower end (discussed below), in order to raise the overall rigidity of this surface.

Figure 1B:
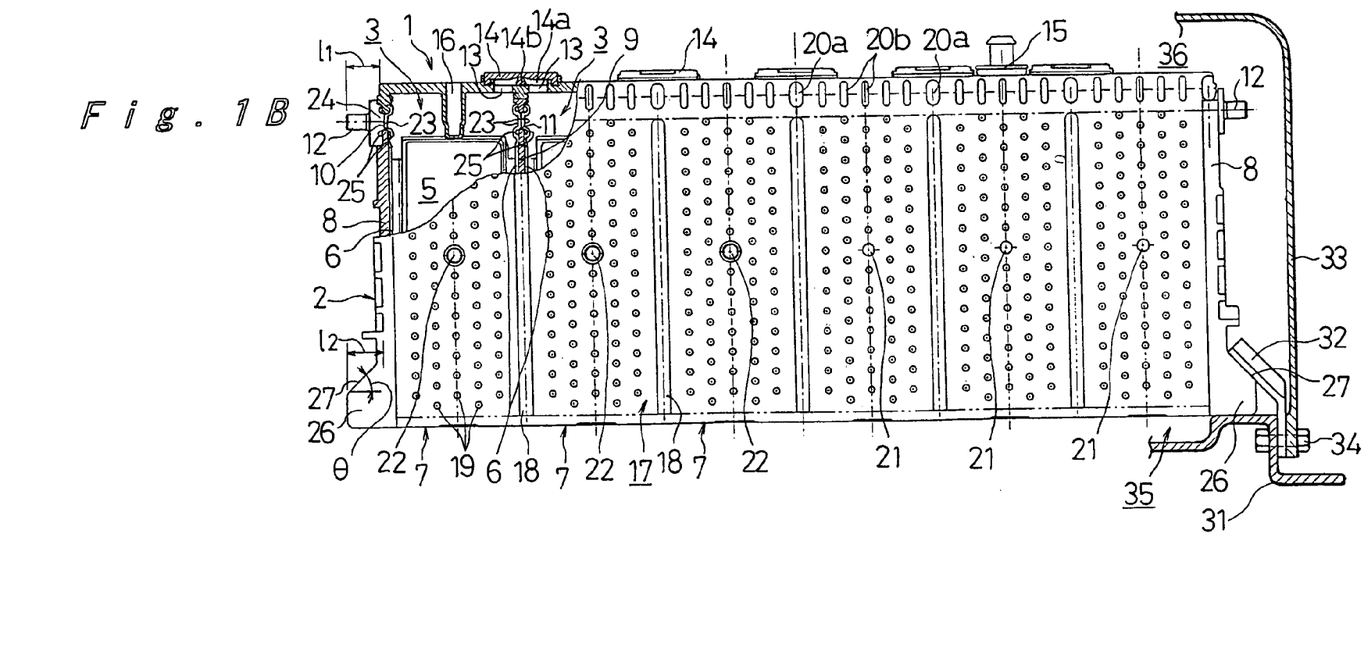

As shown in FIGS. 1B and 3, the protruding components 26, which protrude outward, are provided at the lower end parts of the end walls 8. The protruding length $1_2$ of these protruding components 26 from the end walls 8 is preferably set about 1 to 10 mm greater than the protruding length $1_1$ of the electrode terminals 12 from the end walls 8. The top surface of each of these protruding components 26 comprises an inclined surface 27 that inclines diagonally downward toward the outer end, and the angle of inclination θ of the inclined surface with respect to the horizontal plane is set to between 5° and 60°, and preferably about 45°±10°.

Through-holes 13 are formed in the top surface of the lid 4 at locations corresponding to adjacent ends of neighboring cell cases 3, and a communicating lid 14 in which is formed a communication passage 14a that communicates between these through-holes 13 is welded over the lid 4. Numeral 14b is a reinforcing ridge provided in the center of the inner surface of the communicating lid 14. This ridge is of such a size as to keep the communication passage 14a from closing, and its distal end is pressed against and welded to the upper surface of the lid 4, which ensures the pressure-resistance strength of the communicating lid 14.

The integral battery case 2, the lid 4, and the communicating lid 14 are made from a synthetic resin material such as PP/PPE (polypropylene/polypropylene-ethylene copolymer) alloy, and repel electrolyte.

A single safety vent 15 is provided to the lid 4 in order to release the pressure if the internal pressure of the cell cases 3 should go over a certain level. Also, a sensor mounting hole 16 for mounting a temperature sensor that senses the temperature of an appropriate cell 7 is formed as a recess in the lid 4 so as to be in contact with the top end of the electrode plate group of that cell 7.

Ribs 18 extending vertically are provided protruding from the long-side surfaces of the integral battery case 2, each of which lies in the same plane as the long-side surfaces of the cell cases 3, at locations corresponding to the end walls of the cell cases 3, and numerous, relatively small, circular protrusions 19 are provided in a matrix pattern at equal-pitch spacing between the ribs 18. These ribs 18 and protrusions 19 have the same height. In addition, coupling ribs 20a and 20b are formed in the same height as the ribs 18 and the protrusions 19 on the side surfaces of the lid 4 and the top part of the cell cases 3 at locations corresponding to the ribs 18 and the protrusions 19 so as to bridge across the cell cases 3 and the lid 4. These ribs 18, protrusions 19, and coupling ribs 20a and 20b form coolant passages in between the integral battery cases 2 for uniformly and efficiently cooling the cell cases 3 when these integral batty cases 2 are lined up next to each other.

Also, positioning protrusions 21 and recesses 22 that fit together when the integral battery cases 2 are set up with the long-side surfaces thereof facing each other are provided in the approximate centers of the various cell cases 3, symmetric to the center line in the longitudinal direction of the long-side surfaces of the integral battery cases 2.

Figure 4A:
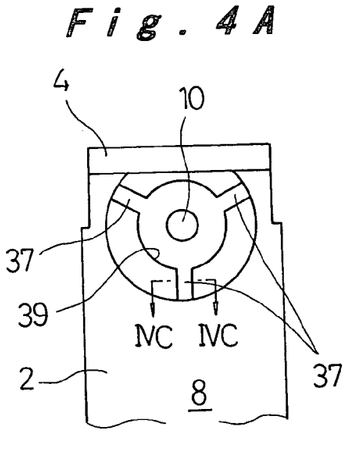
Figures 4B, 4C:
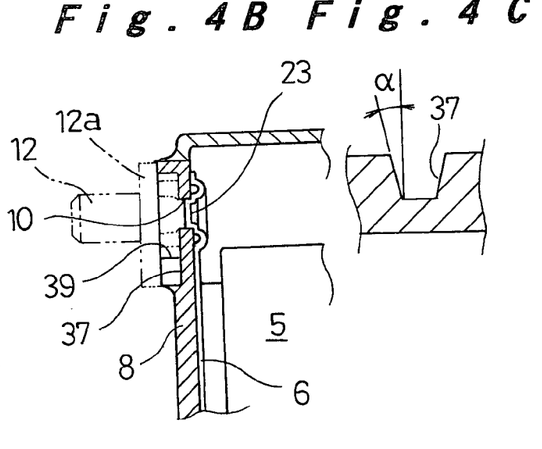

As shown in FIG. 4B, connecting protrusions 23 are formed protruding outward from the upper ends of the collector plates 6, and the electrode plate groups are positioned with respect to the cell cases 3 by fitting these connecting protrusions 23 into the terminal holes 10 or connecting holes 11 formed in the upper ends of the end walls 8 and the partitions 9. The electrical connection of adjacent cells 7 is performed on the inside of the battery by welding together the distal ends of the connecting protrusions 23 fitted into the connecting holes 11 in the partitions 9 between adjacent battery cases 3. At the end walls 8, connecting protrusions 24 that fit into the terminal holes 10 are provided to the electrode terminals 12, and the distal ends of the connecting protrusions 23 and 24 of the collector plates 6 and the electrode terminals 12, respectively, are welded together. Annular grooves are formed around the connecting protrusions 23 of the collector plates 6 or the connecting protrusions 24 of the electrode terminals 12, and O-rings for sealing between these components and the end walls 8 or the partitions 9 are installed.

Figure 5A:
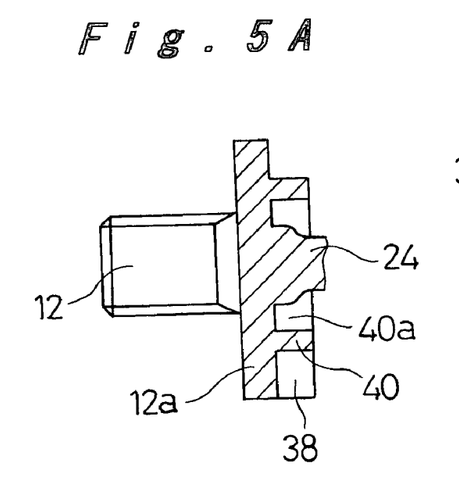
Figure 5B:
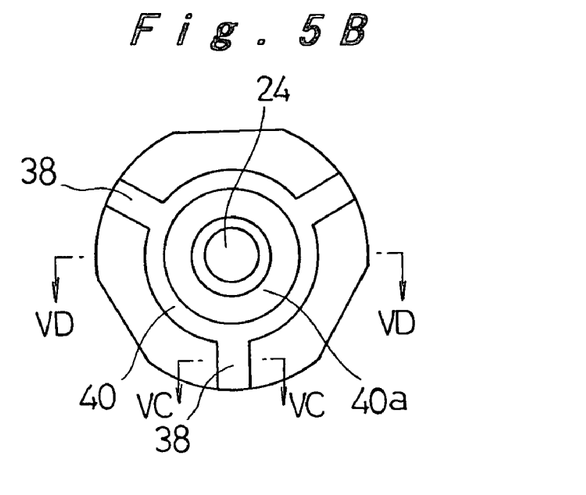

The mounting portion of the above-mentioned electrode terminals 12 will be described in detail through reference to FIGS. 4A to 4C and FIGS. 5A to 5D. As shown in FIGS. 4A to 4C, the area within a specific radius around the terminal hole 10 in the end wall 8 is formed thicker, a circular recess 39 that is coaxial with the terminal hole 10 is formed in the center of this thicker portion, and one or more engagement grooves 37 are formed radially around this axis. As shown in FIGS. 5A and 5B, the electrode terminal 12 is configured such that the connecting protrusion 24, which fits into the terminal hole 10, is provided in the center of a disk-shaped seat 12a on the side thereof that is joined to the end wall 8, around which is provided an annular protrusion 40 that fits into the circular recess 39, and around this are radially provided engagement tabs 38 that engage with the engagement grooves 37. A sealing O-ring is installed in the annular groove 40a between the annular protrusion 40 and the connecting protrusion 24.

Figure 5C:
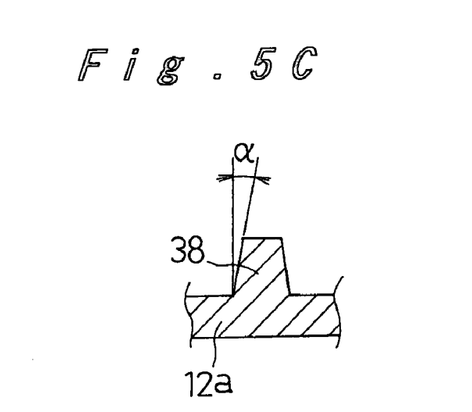

If a mating taper α is provided as shown in FIGS. 4C and 5C to the engagement grooves 37 on the end wall 8 and to the engagement tabs 38 into which these engagement grooves 37 are fitted and engaged, insertion will be smoother in fitting and engagement, thereby preventing the electrode terminals from being improperly fastened. The angle of this mating taper α is preferably 5 to 20°.

Figure 5D:
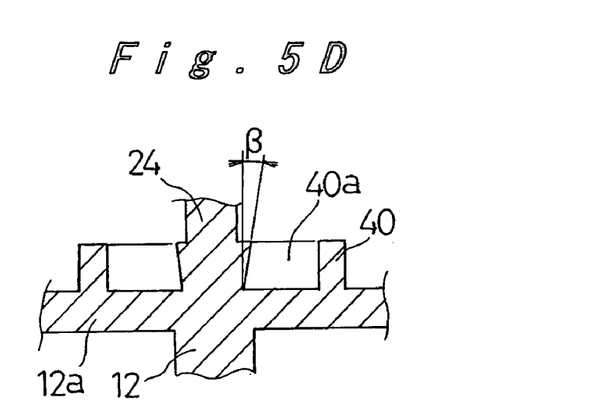

Also, if a reverse taper β is provided as shown in FIG. 5D to the inner peripheral walls of the annular groove 40a of the electrode terminal 12, this will prevent the O-rings from falling out or lifting up after they are installed around the outside of the connecting protrusions 24 of the electrode terminals 12 and before they are fastened to the end walls 8. The angle of this reverse taper β is preferably 0 to 10°.

A plurality of the prismatic battery modules 1 described above are arranged in a row with their long-side surfaces 17 facing each other, end plates are disposed at both ends in this arrangement direction, and these end plates are linked by binding bands to produce a battery pack. This battery pack is installed on a carrier tray 31 as shown FIG. 1B. When installed on its carrier tray 31, the battery pack is fixed in place by pressing down with clamps 32 on the inclined surfaces 27 at the top of the protruding components 26 provided at the lower ends of the battery modules 1, and the upper portion is covered with a cover 33. These clamps 32 and the cover 33 are fastened by bolts 34 to the carrier tray 31. A cooling air introduction space 35 for distributing cooling air over the entire lower surface of the battery pack is formed in the carrier tray 31, a cooling air exhaust space 36 is formed between the cover 33 and the top outer surface of the battery pack, and cooling air is passed between the lined-up battery modules 1 to effectively cool the cells 7.

With the battery module 1 structured as above, because the protruding components 26 are provided protruding from the end walls 8 of the integral battery case 2, even if this battery module 1 is hit from the side by an object, this object will hit the protruding components 26 before hitting the electrode terminals 12, and the impact energy will be absorbed by these protruding components 26. Therefore, the electrode terminals 12 will not directly bear the brunt of the impact, thereby preventing short-circuiting that would otherwise be caused by movement of the electrode terminals.

Further, because the protruding components 26 are provided protruding from the end walls 8 of the integral battery case 2, when the battery is mounted on the carrier tray 31, as shown in FIG. 1, a cooling air introduction space 35 is formed under the battery which is sealed by the protruding components 26. The cooling air introduction space 35 extends from one end to the other end of the integral battery case 2, which enables each cell 7 to be cooled effectively.

Also, the protruding components 26 protrude from the lower ends of the end walls 8, and their top surfaces comprise inclined surfaces 27 that incline diagonally downward toward the outer ends at 5° to 60°, and preferably about 45°±10°, with respect to the horizontal plane, and when the battery pack is installed on the carrier tray 31, these inclined surfaces 27 are pressed down and fixed by the clamps 32, so the battery pack can be fixed in place without exerting any load on the electrode teals 12, and the battery module 1 is restricted from moving not only in the vertical direction, but also in the longitudinal direction of the integral battery case 2.

As described above, the end walls 8 of the integral battery case 2 are configured such that a thick-walled portion 28 is formed to one side of the portion close to the terminal holes 10 so that the thickness is not the same on both sides of each of the terminal holes 10. Therefore, when the resin splits up and flows to the left and right sides at the terminal holes 10 during the injection molding of the integral battery case 2, the resin flows will be different on the two sides, and as a result, as shown in FIG. 2, the weld line 29 formed when the resin flows on the two sides come into contact above the terminal holes 10 is formed diagonally above at a position away from the center line of the terminal holes. Specifically, the weld line 29 is located away from the center line location of the terminal holes 10 where the cross sectional area is smallest and stress builds up. Therefore, since the weld line 29 is not in the high-stress area, cracks will not readily develop should the internal pressure rise in the cell cases 3 in the integral battery case 2 or should the electrode terminals 12 be subjected to an external force or vibration, and adequate attachment strength can be ensured for the electrode terminals 12.

Also, because the overall rigidity is enhanced by providing horizontal ribs 8a and vertical ribs 8b to the end walls 8, even if the inter cell pressure rises and exerts a high load on the end walls 8, distention of the end walls 8 can be effectively suppressed by these ribs so that it will have no adverse effect on the connections of the electrode terminals 12, and the proper connected state can be maintained.

Also, because the engagement tabs 38 are engaged with the radial engagement grooves 37 in the mounting portion of the electrode terminals 12, the rotational torque that results when a bus bar or external connection lead is connected to the electrode terminals 12 can be received over a larger surface area, this surface area can be easily increased by increasing the number of engagement grooves 37 and engagement tabs 38, and stress at the plane of engagement where load is received can be reduced and the breaking limit with respect to the torque exerted on the electrode terminals 12 during connection can be raised, both with a compact structure. Furthermore, fitting the circular recesses 39 together with the annular protrusions 40 will cause the load produced by rotational torque to be perpendicular at all times to the plane of engagement between the engagement grooves 37 and engagement tabs 38, so a higher load-bearing strength will be attained and the breaking limit can be further raised.

According to the present embodiment, the adjacent cells 7 are serially connected by the connecting protrusions 23 formed by press molding the collector plates 6, so internal connection within the integral battery case 2 is possible and no separate connecting parts are required, and fewer parts means the connections can be simpler and lower in cost. Moreover, since the connecting protrusions 23 and the collector plates 6 are integrated and connected by welding at a single place, a connection with extremely low electrical resistance is possible.

In addition, through-holes 13 are formed in the lid 4 at the adjacent ends of neighboring cell cases 3, and a communicating lid 14 in which is formed a communication passage 14a that communicates between these through-holes 13 is welded over the lid 4. As a result, the internal pressure is equalized between the cell cases 3, which prevents the service life of the cells 7 from being shortened by rises in the inter pressure of some of the cell cases 3, and in turn prevents an attendant decrease in the service life of the sealed prismatic battery 1. This can be achieved at low cost because a single safety vent 15 is just provided to the lid 4.

Figure 6A:
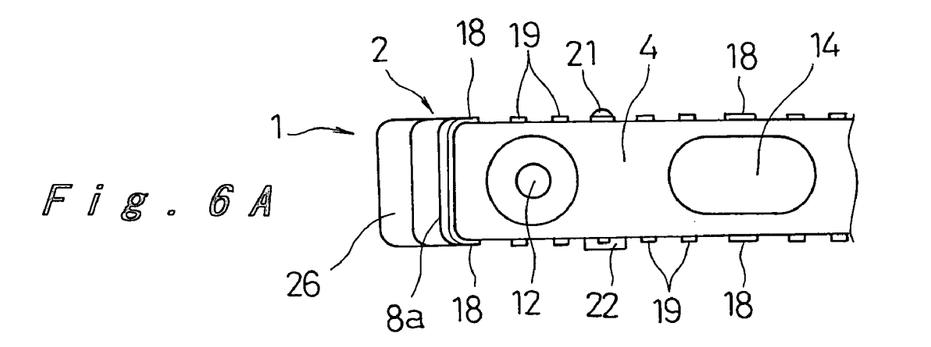
Figure 6B:
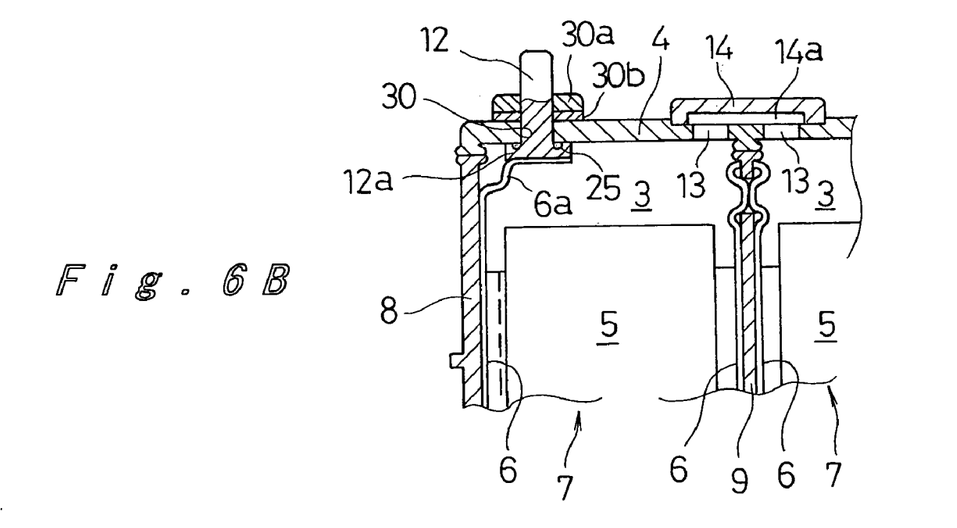

Another embodiment of the present invention will now be described through reference to FIGS. 6A and 6B. Structural elements that are the same as in the above embodiment are labeled with the same numbers and will not be described again, and only the differences will be discussed.

In the above embodiment, the above electrode terminals 12 were provided protruding outward from the end walls 8 of the integral battery case 2, but in this embodiment, terminal holes 30 are formed at both ends on top of the lid 4, and the electrode terminals 12 are mounted by being passed through these terminal holes 30 from the inside. Each electrode terminal 12 is fixed in place by sandwiching the top wall of the lid 4 between the seat 12a and a fixing nut 30a, and this is double-sealed by a sealing member 30b interposed between the fixing nut 30a and the upper surface of the top wall of the lid 4, and an O-ring 25 interposed between the seat 12a of the electrode terminal 12 and the lower surface of the top wall of the lid 4. Extensions 6a extending upward are formed on the collector plates 6 provided along the inner surfaces of the end walls 8 of the cells 7 at both ends, and the distal ends of these extensions are connected to the seats 12a of the electrode terminals 12.

With this embodiment, even if the battery module 1 is bit by an object from the side while installed on its carrier tray, because the electrode terminals 12 are provided on top of the lid 4, they will not be directly subjected to a large impact, which prevents the short-circuiting that could otherwise result from the movement of the electrode terminals 12. Work is also facilitated because the electrode terminals 12 can be accessed from above for connection of a bus bar or external connection lead.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A sealed, prismatic, rechargeable battery comprising:
a prismatic battery case having longitudinal opposite end walls;
said longitudinal opposite end walls of said prismatic battery case defining terminal holes therein;
electrode terminals respectively mounted in each of said terminal holes;
protruding components formed protruding from each of said longitudinal opposite end walls of the prismatic battery case; and
said protruding components extending from a base region of respective longitudinal opposite end walls of the prismatic battery case and including an angled surface, wherein the protruding components protrude further than the electrode terminals from the longitudinal opposite end walls.

2. The sealed, prismatic, rechargeable battery according to claim 1, wherein each of the protruding components has an inclined top surface that inclines diagonally downward toward an outer end of the protruding components, respectively.

3. The sealed, prismatic, rechargeable battery according to claim 2, wherein the angle of inclination of the inclined top surfaces is 5° to 60° with respect to a horizontal plane.

4. The sealed, prismatic, rechargeable battery according to claim 2, wherein the angle of inclination of the inclined top surfaces is 45°±10° with respect to a horizontal plane.

5. A sealed, prismatic, rechargeable battery comprising:
a prismatic battery case having longitudinal opposite end walls;
said longitudinal opposite end walls of said prismatic battery case defining terminal holes therein;
one or more engagement grooves formed around said terminal holes in the end walls, extending radially with respect to said terminal holes and tapered at an angle in an axial direction of said terminal holes such that a bottom width of said engagement grooves is greater than a top width of said one or more engagement grooves; and electrode terminals having engagement tabs fitting into and engaging with said engagement grooves.

6. A sealed, prismatic, rechargeable battery comprising:

a prismatic battery case having longitudinal opposite end walls;

said longitudinal opposite end walls of said prismatic battery case defining terminal holes therein; and electrode terminals respectively mounted in each of said terminal holes, wherein each of said longitudinal opposite end walls of the prismatic battery case has a first wall portion laterally adjacent one side of each of said terminal holes and extending laterally to a first vertical longitudinal edge of said longitudinal end wall and having a first thickness that is different than a second thickness of a second portion of each of the longitudinal opposite end walls laterally adjacent another side of said terminal holes and extending laterally to a second vertical longitudinal edge of said longitudinal end wall.

7. A sealed, prismatic, rechargeable battery comprising:

a prismatic battery case having longitudinal opposite end walls;

said longitudinal opposite end walls of said prismatic battery case defining terminal holes therein;

electrode terminals respectively mounted in each of said terminal holes;

at least one first rib formed protruding from each of said longitudinal opposite end walls of the prismatic battery case parallel to a short-side direction of the end walls;

at least one second rib formed protruding from each of said longitudinal opposite end walls of the prismatic battery case parallel to the long-side direction of the end walls; and at least one first rib of said at least one first rib and at least one second rib of said at least one second rib intersecting with one another at an inner surface area of said longitudinal end walls removed from edges of said longitudinal end walls.

8. A sealed, prismatic, rechargeable battery comprising:

a prismatic battery case having longitudinal opposite end walls;

said longitudinal opposite end walls of said prismatic battery case defining terminal holes therein;

electrode terminals respectively mounted in each of said terminal holes; and protruding components formed protruding from each of said longitudinal opposite end walls of the prismatic battery case, wherein the protruding components protrude further than the electrode terminals and the protruding components protrude 1 mm to 10 mm further than the electrode terminals.

9. A sealed, prismatic, rechargeable battery comprising:

a prismatic battery case having longitudinal opposite end walls;

at least one first rib formed protruding from each of said longitudinal opposite end walls of the prismatic battery case parallel to a short-side direction of the end walls;

at least one second rib formed protruding from each of said longitudinal opposite end walls of the prismatic battery case parallel to the long-side direction of the end walls; and at least one first rib of said at least one first rib and at least one second rib of said at least one second rib intersecting with one another at an inner surface area of said longitudinal end walls removed from edges of said longitudinal end walls.

10. A sealed, prismatic, rechargeable battery comprising:

a prismatic battery case having longitudinal opposite end walls;

said longitudinal opposite end walls of said prismatic battery case defining terminal holes therein;

one or more engagement grooves formed around said terminal holes in the end walls, extending radially with respect to said terminal holes and tapered at an angle in an axial direction of said terminal holes such that a bottom width of said engagement grooves is greater than a top width of said one or more engagement grooves;

electrode terminals having engagement tabs fitting into and engaging with said engagement grooves; and each of the electrode terminals having a mounting structure including:

a disk-shaped seat having a first surface from which the electrode terminal protrudes, and said disk-shaped seat having a connecting protrusion protruding from a second surface opposite said first surface of the disk-shaped seat;

an annular groove formed around and coaxial with said connecting protrusion; and an annular protrusion around and coaxial with said annular groove, wherein said engagement tabs are formed extending radially and centered around the connecting protrusion.

11. The sealed, prismatic, battery according to claim 10, wherein an angle of the taper is between 5° to 20°.

12. The sealed, prismatic, rechargeable battery according to claim 10, wherein an inner peripheral wall of said annular groove has a taper towards the electrode terminal such that a bottom groove width is greater than a top groove width of said annular groove.

13. The sealed, prismatic, battery according to claim 12, wherein an angle of the taper of the annular groove is between 0° to 10°.

* * * * *